US009832676B2

(12) United States Patent
Ye

(10) Patent No.: US 9,832,676 B2
(45) Date of Patent: Nov. 28, 2017

(54) APPARATUSES AND METHODS FOR STEERING DATA TRAFFIC BETWEEN HETEROGENEOUS NETWORKS

(71) Applicant: Acer Incorporated, New Taipei (TW)

(72) Inventor: Shiang-Rung Ye, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 528 days.

(21) Appl. No.: 14/280,877

(22) Filed: May 19, 2014

(65) Prior Publication Data
US 2015/0098446 A1 Apr. 9, 2015

Related U.S. Application Data

(60) Provisional application No. 61/886,858, filed on Oct. 4, 2013, provisional application No. 61/896,197, filed
(Continued)

(51) Int. Cl.
*H04W 28/02* (2009.01)
*H04W 36/00* (2009.01)
*H04W 28/08* (2009.01)

(52) U.S. Cl.
CPC ....... *H04W 28/0226* (2013.01); *H04W 28/08* (2013.01); *H04W 36/0066* (2013.01)

(58) Field of Classification Search
CPC ............ H04W 28/0226; H04W 28/08; H04W 36/0055; H04W 36/0066; H04W 36/14;
(Continued)

(56) References Cited

U.S. PATENT DOCUMENTS 9,203,563 B2 * 12/2015 Etemad ................. H04W 28/08
9,237,479 B2 1/2016 Ma
(Continued)

FOREIGN PATENT DOCUMENTS

CN 102833813 A 12/2012
CN 102892143 A 1/2013
(Continued)

OTHER PUBLICATIONS

Chinese language office action dated Jul. 15, 2015, issued in application No. TW 103124209.
(Continued)

Primary Examiner — Hassan Kizou
Assistant Examiner — Roberta A Shand
(74) Attorney, Agent, or Firm — McClure, Qualey & Rodack, LLP

(57) ABSTRACT

A mobile communication device is provided with a first wireless module, a second wireless module, and a controller module. The first and second wireless modules perform wireless transmissions and receptions to and from a telecommunication network and an AP using a cellular technology and an SRW technology, respectively. The controller module receives, from the telecommunication network via the first wireless module, at least one RAN rule and information concerning an amount of the data traffic to be offloaded and a level of granularity of the data traffic to be reported for offloading. Also, the controller module receives a first traffic offloading request from the telecommunication network via the first wireless module in response to determining that one of the RAN rule is satisfied, and offloads data traffic indicated by the first traffic offloading request from the telecommunication network to the AP via the second wireless module.

36 Claims, 7 Drawing Sheets

Related U.S. Application Data on Oct. 28, 2013, provisional application No. 61/901,102, filed on Nov. 7, 2013.

(58) Field of Classification Search
CPC ..... H04W 36/22; H04W 48/14; H04W 48/18; H04W 76/045; H04W 76/046
See application file for complete search history.

(56) References Cited

U.S. PATENT DOCUMENTS

| | | |
|---|---|---|
| 9,516,685 B2 | 12/2016 | Lei et al. |
| 9,642,031 B2 | 5/2017 | Han et al. |
| 2011/0075675 A1 | 3/2011 | Koodli et al. |
| 2012/0023189 A1* | 1/2012 | Giaretta ................ H04W 48/18 709/217 |
| 2013/0089076 A1* | 4/2013 | Olvera-Hernandez H04W 36/08 370/332 |
| 2013/0122910 A1 | 5/2013 | Singh et al. |
| 2013/0287012 A1* | 10/2013 | Pragada .............. H04W 76/045 370/338 |
| 2014/0204909 A1* | 7/2014 | Cheng ................. H04W 8/082 370/331 |
| 2015/0045038 A1* | 2/2015 | Gao ..................... H04W 36/22 455/438 |
| 2015/0092553 A1* | 4/2015 | Sirotkin ................ H04W 28/08 370/235 |
| 2015/0358893 A1* | 12/2015 | Laselva ................ H04W 48/18 370/329 |
| 2015/0373603 A1* | 12/2015 | Jung ..................... H04W 36/14 370/331 |

FOREIGN PATENT DOCUMENTS

| | | |
|---|---|---|
| CN | 102904856 A | 1/2013 |
| CN | 102917406 A | 2/2013 |
| CN | 103338483 A | 10/2013 |
| WO | WO 2012/135793 A2 | 10/2012 |
| WO | WO 2013/042330 A1 | 3/2013 |

OTHER PUBLICATIONS

Chinese language office action dated Jun. 22, 2017, issued in application No. CN 201410457616.1.

\* cited by examiner

APPARATUSES AND METHODS FOR STEERING DATA TRAFFIC BETWEEN HETEROGENEOUS NETWORKS

CROSS REFERENCE TO RELATED APPLICATIONS

This Application claims priority of U.S. Provisional Application No. 61/886,858, filed on Oct. 4, 2013, the entirety of which is incorporated by reference herein. This Application claims priority of U.S. Provisional Application No. 61/896,197, filed on Oct. 28, 2013, the entirety of which is incorporated by reference herein. This Application claims priority of U.S. Provisional Application No. 61/901,102, filed on Nov. 7, 2013, the entirety of which is incorporated by reference herein.

BACKGROUND OF THE INVENTION

Field of the Invention

The invention generally relates to the provision of communication services across heterogeneous networks, and more particularly, to apparatuses and methods for steering data traffic associated with a mobile communication device between a telecommunication network utilizing a cellular technology and an Access Point (AP) utilizing a Short Range Wireless (SRW) technology.

Description of the Related Art

With growing demand for ubiquitous computing and networking, various wireless technologies have been developed, such as Short Range Wireless (SRW) technologies, including the Wireless Fidelity (WiFi) technology, Bluetooth technology, and the Zigbee technology, etc., and also, cellular technologies, including the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, and Time-Division LTE (TD-LTE) technology, etc.

For user convenience and flexibility, most Mobile Stations (MSs) (also referred to as User Equipments (UEs)) nowadays are equipped with more than one wireless communication module for supporting different wireless technologies. However, each wireless technology has its own features, such as bandwidth, average coverage, and service rate, etc. Particularly, the bandwidth and coverage provided to an MS by a wireless network may vary according to the conditions of the location of the MS and/or the time conditions.

Using an MS equipped with a WCDMA module and a WiFi module as an example, it may selectively obtain wireless services using the WCDMA technology or the WiFi technology. Generally, the wireless services obtained from a WCDMA network have a rather limited bandwidth, but better mobility, while the wireless services obtained from a WiFi AP have a sufficient bandwidth, but lack mobility. However, the feature of better mobility of the WCDMA network is more likely accompanied with rapid changes of radio signal quality for the MS, while the feature of low mobility of the WiFi AP is usually accompanied with rather stable radio signal quality for the MS. Thus, it is desirable to have a more flexible way of steering data traffic for the MS between heterogeneous networks.

BRIEF SUMMARY OF THE INVENTION

In one aspect of the invention, a mobile communication device is provided. The mobile communication device comprises a first wireless module, a second wireless module, and a controller module. The first wireless module performs wireless transmissions and receptions to and from a telecommunication network using a cellular technology. The second wireless module performs wireless transmissions and receptions to and from an Access Point (AP) using an SRW technology. The controller module receives, from the telecommunication network via the first wireless module, at least one Radio Access Network (RAN) rule and information concerning an amount of the data traffic to be offloaded and a level of granularity of the data traffic to be reported for offloading, wherein the level of granularity specifies a per Data Radio Bearer (DRB) basis, a per Packet Data Network (PDN) connection basis, or a per PDN basis. Also, the controller module receives a first traffic offloading request from the telecommunication network via the first wireless module in response to determining that one of the RAN rule is satisfied, and offloads data traffic indicated by the first traffic offloading request from the telecommunication network to the AP via the second wireless module.

In another aspect of the invention, an access network of a telecommunication network is provided. The access network comprises an access node comprising a wireless module and a controller module. The wireless module performs wireless transmissions and receptions to and from a mobile communication device using a cellular technology. The controller module transmits, to the mobile communication device via the wireless module, at least one RAN rule and information concerning an amount of the data traffic to be offloaded and a level of granularity of the data traffic to be reported for offloading, wherein the level of granularity specifies a per DRB basis, a per PDN connection basis, or a per PDN basis. Also, when one of the RAN rule is satisfied for the mobile communication device, the controller module transmits a first traffic offloading request to the mobile communication device via the wireless module, to request the mobile communication device to offload data traffic to an AP using an SRW technology.

In yet another aspect of the invention, a method for steering data traffic associated with a mobile communication device between a telecommunication network utilizing a cellular technology and an AP utilizing an SRW technology is provided. The method comprises the steps of: transmitting, by the telecommunication network, at least one RAN rule and information concerning an amount of the data traffic to be offloaded and a level of granularity of the data traffic to be reported for offloading to the mobile communication device, wherein the level of granularity specifies a per DRB basis, a per PDN connection basis, or a per PDN basis; determining, by the mobile communication device, that one of the RAN rule is satisfied; transmitting, by the telecommunication network, a first traffic offloading request to the mobile communication device when the one of the RAN rule is satisfied for the mobile communication device; and offloading, by the mobile communication device, data traffic indicated by the first traffic offloading request to the AP.

Other aspects and features of the present invention will become apparent to those with ordinarily skill in the art upon review of the following descriptions of specific embodiments of the mobile communication devices, the access networks, and the methods for steering data traffic associated with a mobile communication device between a telecommunication network and an AP.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
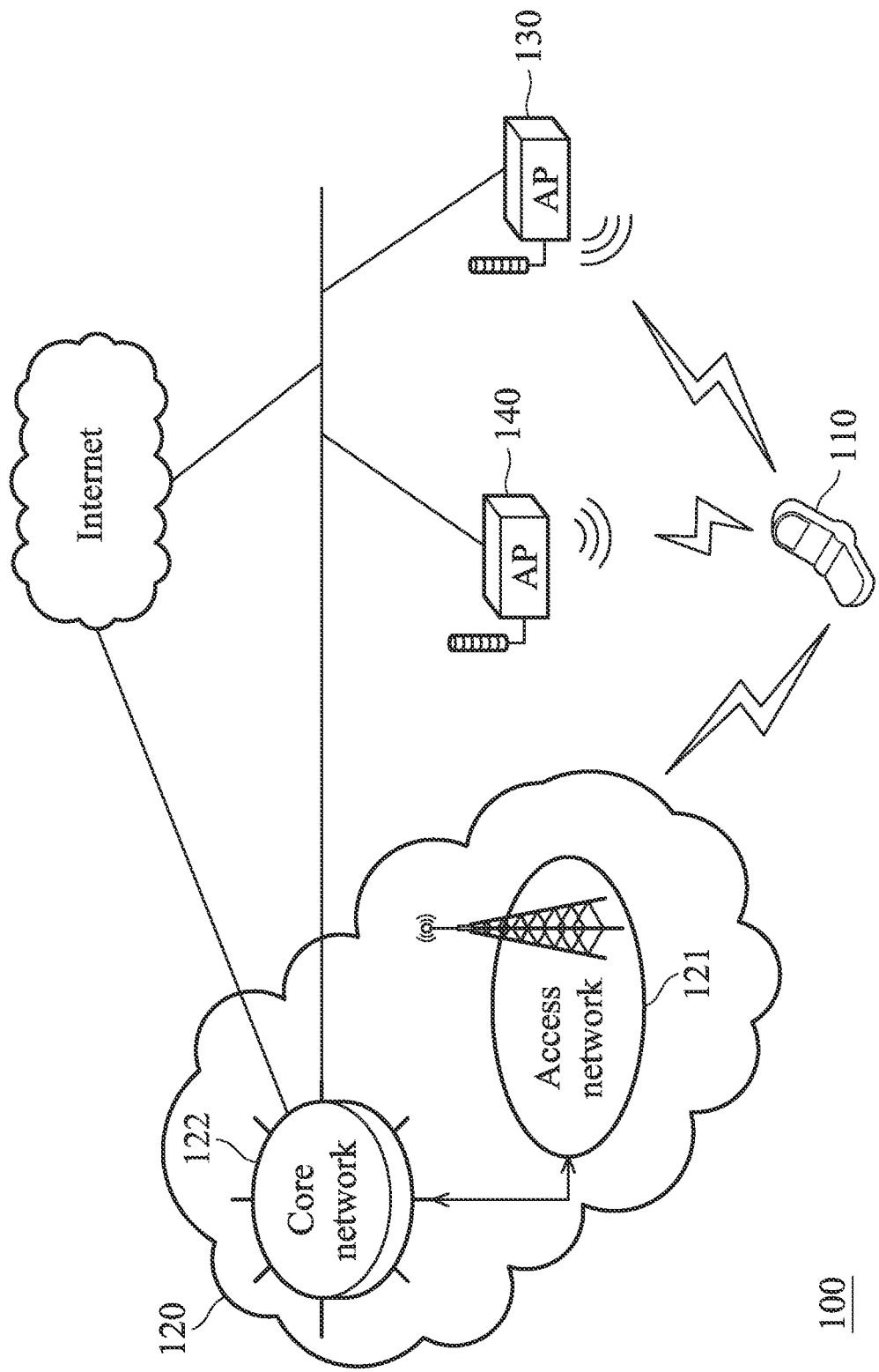
FIG. 1 is a block diagram of a wireless communications environment according to an embodiment of the invention.

FIG. 1 is a block diagram of a wireless communications environment according to an embodiment of the invention. The wireless communications environment 100 comprises a mobile communication device 110, a telecommunication network 120 and APs 130 and 140. The mobile communication device 110 may be a smartphone, a panel Personal Computer (PC), a laptop computer, or any computing device supporting at least the SRW technology utilized by the APs 130 and 140 and the cellular technology utilized by the telecommunication network 120. The mobile communication device 110 may selectively connect to one or both of the telecommunication network 120 and the AP 130 or 140 for obtaining wireless services. The telecommunication network 120 may be a GSM system, GPRS system, WCDMA system, CDMA-2000 system, TD-SCDMA system, WiMAX system, LTE system, or TD-LTE system, etc., depending on the cellular technology in use. The telecommunication network 120 comprises at least an access network 121 and a core network 122, wherein the access network 121 is controlled by the core network 122 to provide the functionality of wireless transceiving for the telecommunication network 120. For example, if the telecommunication network 120 is a WCDMA system, the access network 121 may be a Universal Terrestrial Radio Access Network (UTRAN) which includes at least a Node B and a Radio Network Controller (RNC), and the core network 122 may be a General Packet Radio Service (GPRS) core which includes a Home Location Register (HLR), at least one Serving GPRS Support Node (SGSN), and at least one Gateway GPRS Support Node (GGSN). Alternatively, if the telecommunication network 120 is an LTE or LTE-Advanced system, the access network 121 may be an Evolved-UTRAN (E-UTRAN) which includes at least an evolve Node B (eNB), and the core network 122 may be an Evolved Packet Core (EPC) which includes a Home Subscriber Server (HSS), Mobility Management Entity (MME), Serving Gateway (S-GW), and Packet Data Network Gateway (PDN-GW or P-GW).

The APs 130 and 140 may each form a SRW network, implemented as alternatives for providing wireless services for the mobile communication device 110. For example, the APs 130 and 140 may be installed by or operate in cooperation with the operator of the telecommunication network 120. Specifically, the APs 130 and 140 may connect to a local area network by an Ethernet cable, and they typically receive, buffer, and transmit data traffic which is to be directed to and from the mobile communication device 110. The APs 130 and 140 may be connected to the core network 122 directly or indirectly via the Internet, as shown in FIG. 1. In general, for the APs 130 and 140 utilizing the WiFi technology, each of them may have, on average, a coverage varying from 20 meters in an area with obstacles (walls, stairways, elevators etc) to 100 meters in an area with a clear line of sight. Alternatively, the APs 130 and 140 may utilize another SRW technology, such as Bluetooth technology, Zigbee technology, or others, and the invention is not limited thereto.

Figure 2:
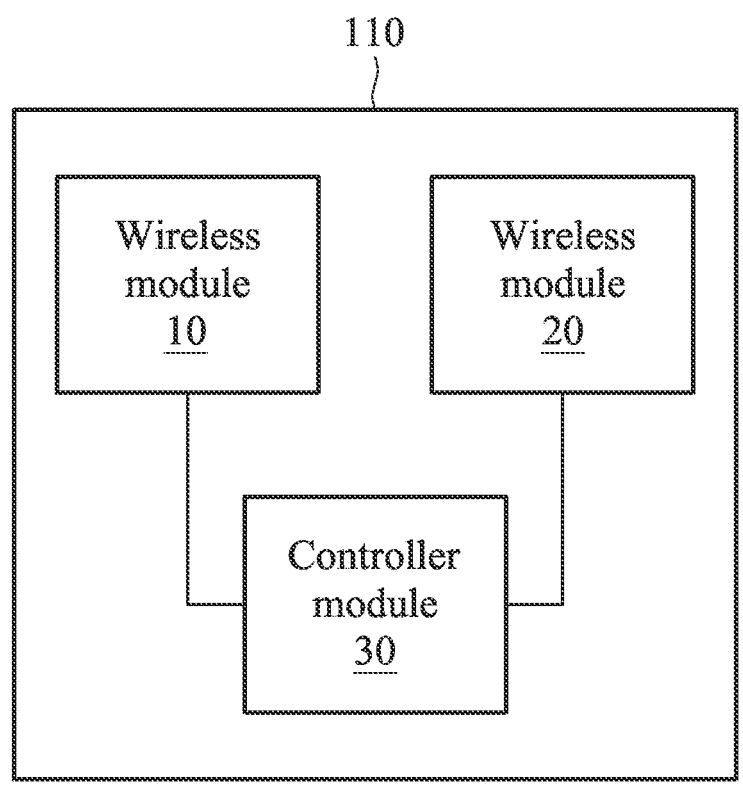
FIG. 2 is a block diagram illustrating the mobile communication device 110 according to an embodiment of the invention.

FIG. 2 is a block diagram illustrating the mobile communication device 110 according to an embodiment of the invention. The mobile communication device 110 comprises two wireless modules 10 and 20, and a controller module 30. The wireless module 10 is responsible for performing the functionality of wireless transmissions and receptions to and from the telecommunication network 120. The wireless module 20 is responsible for performing wireless transmissions and receptions to and from the AP 130 or 140. The controller module 30 is responsible for controlling the operations of the wireless modules 10 and 20, and other functional components (not shown), such as a display unit and/or keypad serving as the Man-Machine Interface (MMI), a storage unit storing the program code of applications or communication protocols, a Global Positioning System (GPS) unit for obtaining location information, or others. Also, the controller module 30 controls the wireless modules 10 and 20 for performing the method for steering data traffic in the present invention.

To further clarify, each of the wireless modules 10 and 20 may be a respective Radio Frequency (RF) unit, and the controller module 30 may be a Micro Control Unit (MCU) of a baseband unit, e.g., a baseband chip. For example, the wireless module 10 may be an LTE RF unit and the controller module 30 may be an MCU of a LTE baseband unit, while the wireless module 20 may be a WiFi RF unit incorporated with a WiFi baseband unit. Alternatively, each of the wireless modules 10 and 20 may be a respective RF unit incorporated with a respective baseband unit, and the controller module 30 may be a general-purpose processor, an application processor, or an MCU. For example, the wireless module 10 may be an LTE RF unit incorporated with an LTE baseband unit, the wireless module 20 may be a WiFi RF unit incorporated with a WiFi baseband unit, and the controller module 30 may be an MCU.

The baseband unit may contain multiple hardware devices to perform baseband signal processing, including Analog-to-Digital Conversion (ADC)/Digital-to-Analog Conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 2.4 GHz, 3.6 GHz, 4.9 GHz, or 5 GHz utilized in WiFi technology, or 900 MHz, 1900 MHz, or 2100 MHz utilized in WCDMA systems, or 900 MHz, 2100 MHz, or 2.6 GHz utilized in LTE/LTE-Advanced systems, or others depending on the wireless technology in use.

Although not shown, it should be understood that the access network 121 at least includes an access node, e.g., an eNB, and similar to the embodiment of FIG. 2, the access node may comprise a wireless module for performing the functionality of wireless transmissions and receptions to and from the mobile communication device 110 and a controller module for controlling the operations of the wireless module. Detailed description of the wireless module and the controller module is similar to the embodiment of FIG. 2 and is not repeated herein for brevity.

Figure 3:
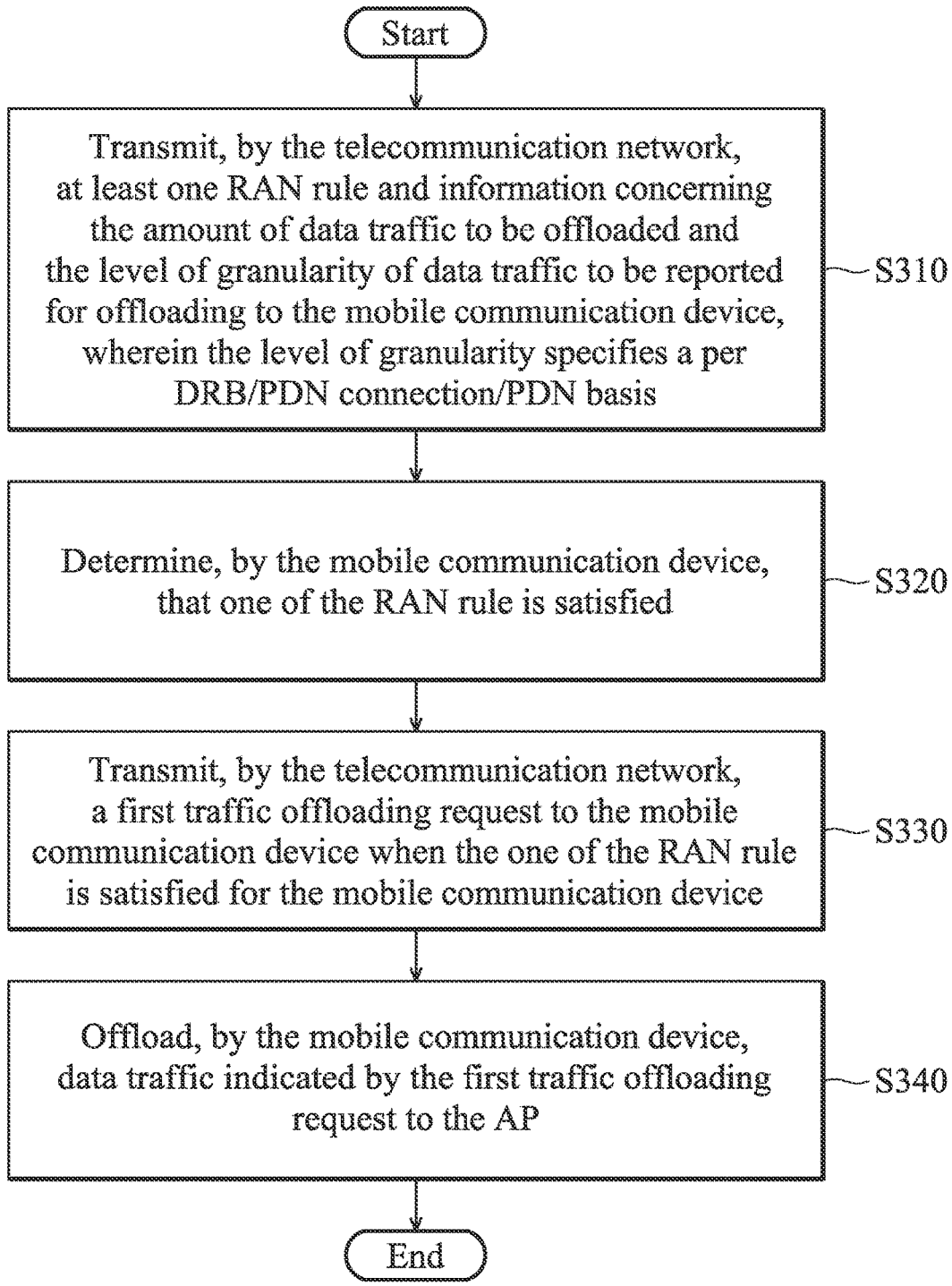
FIG. 3 is a flow chart illustrating the method for steering data traffic associated with a mobile communication device between a telecommunication network utilizing a cellular technology and an AP utilizing an SRW technology according to an embodiment of the invention.

FIG. 3 is a flow chart illustrating the method for steering data traffic associated with a mobile communication device between a telecommunication network utilizing a cellular technology and an AP utilizing an SRW technology according to an embodiment of the invention. The method may be applied in the Media Access Control (MAC) layer, the Radio Resource Control (RRC) layer, and/or the Non-Access Stratum (NAS) layer of the communication protocol in use between the mobile communication device and the telecommunication network. In this embodiment, the mobile communication device initially obtains wireless services from the telecommunication network. To begin, the telecommunication network transmits at least one Radio Access Network (RAN) rule and information concerning the amount of data traffic to be offloaded and the level of granularity of data traffic to be reported for offloading to the mobile communication device, wherein the level of granularity specifies a per Data Radio Bearer (DRB) basis, a per Packet Data Network (PDN) connection basis, or a per PDN basis (step S310). In one embodiment, the RAN rule is transmitted via an RRC (Radio Resource Control) CONNECTION RECONFIGURATION message, and in return, the mobile communication device may transmit an RRC CONNECTION RECONFIGURATION COMPLETE message to the telecommunication network, to acknowledge the reception of the RRC CONNECTION RECONFIGURATION message.

Each RAN rule may comprise a first validity condition and a second validity condition, wherein the first validity condition specifies the first signal quality of the telecommunication network being lower than a first threshold, and the second validity condition specifies the second signal quality of the AP being greater than a second threshold. For example, the first validity condition may be defined by an equation as follows:

$$RSRP \text{ or } RSRQ < A,$$

wherein RSRP is short for the Reference Signal Received Power of the telecommunication network, and RSRQ is short for the Reference Signal Received Quality of the telecommunication network, and the second validity condition may be defined by an equation as follows:

$$RSSI > B,$$

wherein RSSI is short for the Received Signal Strength Indicator of the AP. The amount of data traffic to be offloaded is related to the value of A and B. For example, a small value for A and a large value for B may imply a large amount of data traffic to be offloaded.

Subsequent to step S310, the mobile communication device determines that one of the RAN rule is satisfied (step S320). Specifically, after receiving the RAN rule, the mobile communication device keeps measuring or monitoring the signal quality of the telecommunication network and the AP according to the RAN rule, to see if any of the RAN rule is satisfied. Next, when the one of the RAN rule is satisfied for the mobile communication device, the telecommunication network transmits a first traffic offloading request to the mobile communication device (step S330). After that, the mobile communication device offloads the data traffic indicated by the first traffic offloading request to the AP (step S340), and the method ends.

In one embodiment, the first traffic offloading request may be an RRC CONNECTION RECONFIGURATION message or an RRC CONNECTION RELEASE message. If the first traffic offloading request is an RRC CONNECTION RECONFIGURATION message, the mobile communication device may reply with an RRC CONNECTION RECONFIGURATION COMPLETE message. If the first traffic offloading request is an RRC CONNECTION RELEASE message, the mobile communication device does not reply with any message.

Specifically, the data traffic to be offloaded may be determined by the mobile communication device (i.e., UE-based steering of data traffic) or by the telecommunication network (i.e., network-based steering of data traffic).

In cases where the data traffic to be offloaded is determined by the mobile communication device, the mobile communication device may determine one or more DRBs associated with the data traffic when one of the RAN rule is satisfied, and initiate a NAS signaling procedure with the telecommunication network to request deactivation of bearer contexts corresponding to the DRBs, thereby causing the core network of the telecommunication network to instruct the access network of the telecommunication network to transmit the first traffic offloading request.

In cases where the data traffic to be offloaded is determined by the telecommunication network, the mobile communication device may report the traffic information to the telecommunication network when one of the RAN rule is satisfied, and the access network of the telecommunication network may determine one or more DRBs associated with the data traffic according to the traffic information. Subsequently, the access network may directly communicate with the core network or indirectly communicate with the core network via the mobile communication device, for initiating the transmission of the first traffic offloading request. For direct communication with the core network, the access network may request the core network to deactivate the bearer contexts corresponding to the DRBs, and transmit the first traffic offloading request which indicates the DRBs to be offloaded. For indirect communication with the core network, the access network may transmit a second traffic offloading request, e.g., an RRC CONNECTION RECONFIGURATION message, to the mobile communication device to initiate a NAS signaling procedure with the core network for deactivating the bearer contexts corresponding to the DRBs. In response to the second traffic offloading request, the mobile communication device may reply with a second traffic loading response, e.g., an RRC CONNECTION RECONFIGURATION COMPLETE message, to acknowledge the reception of the second traffic offloading request, and initiate the NAS signaling procedure with the core network, thereby causing the core network to instruct the access network to transmit the first traffic offloading request.

Figure 4:
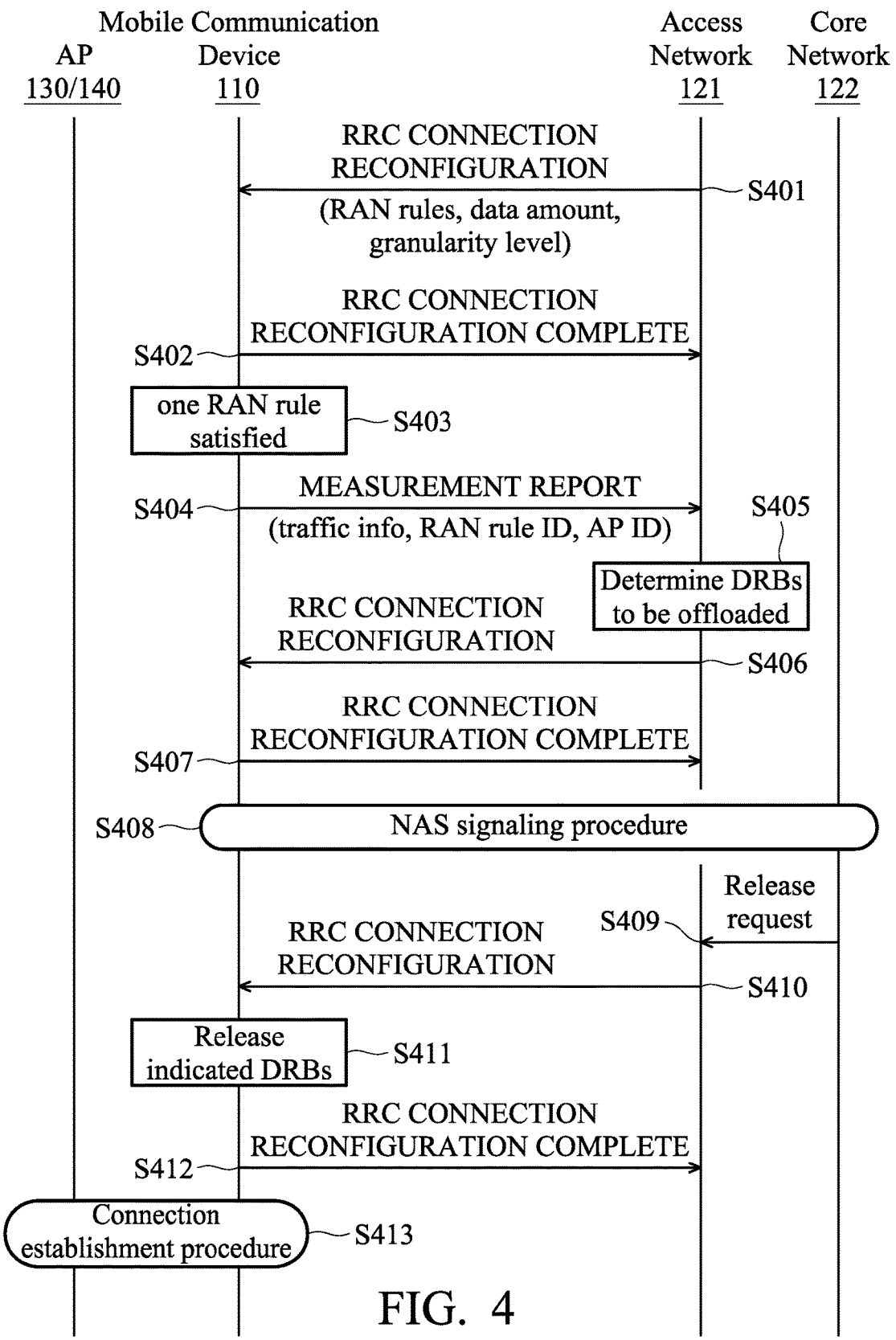
FIG. 4 is a message sequence chart illustrating the network-based steering of data traffic from the telecommunication network 120 to the AP 130 or 140 according to an embodiment of the invention.

FIG. 4 is a message sequence chart illustrating the network-based steering of data traffic from the telecommunication network 120 to the AP 130 or 140 according to an embodiment of the invention. To begin, the access network 121 transmits a list of RAN rules and information concerning the amount of data traffic to be offloaded and the level of granularity of data traffic to be reported for offloading, to the mobile communication device 110 via an RRC CONNECTION RECONFIGURATION message (step S401). Detailed description of the RAN rule, the amount of the data traffic to be offloaded, and the level of granularity of the data traffic to be reported is similar to the embodiment of FIG. 3 and is not repeated herein for brevity. Next, the mobile communication device 110 replies to the access network 121 with an RRC CONNECTION RECONFIGURATION COMPLETE message, to acknowledge the reception of the RRC CONNECTION RECONFIGURATION message (step S402).

Subsequently, the mobile communication device 110 determines that one of the RAN rules is satisfied (step S403). That is, the signal quality of the access network 121 is lower than a first threshold, and the signal quality of the AP 130 or 140 is greater than a second threshold. In response to determining that one of the RAN rules is satisfied, the mobile communication device 110 reports the traffic information, the identification of the satisfied RAN rule, and the identification of the AP 130 or 140 to the access network 121 via a MEASUREMENT REPORT message (step S404).

The traffic information may include any combination of the following: 1) the Quality of Service (QoS) parameters, such as, data rate or type (e.g., Guaranteed Bit Rate (GBR) or non-GBR), and/or Channel Quality Indicator (CQI), etc., of all Data Radio Bearer (DRB) or of the DRBs of a certain type or of the DRBs that the mobile communication device 110 recommends to be offloaded; 2) the indicators, each of which indicates whether a respective one of the DRBs is a default Evolved Packet System (EPS) bearer or a dedicated EPS bearer; 3) the information concerning Access Point Names (APNs) or PDN connections, to each of which a respective one of the DRB belongs; and 4) the information concerning Access Point Names (APNs) or Packet Data Network (PDN) connections, to each of which a respective one of the DRB belongs.

The identification of the AP 130 or 140 may be the Service Set Identification (SSID), Basic SSID (BSSID), or Extended SSID (ESSID) of the AP 130 or 140.

When receiving the MEASUREMENT REPORT message, the access network 121 determines the DRBs associated with the data traffic to be offloaded according to received report (including the traffic information, the identification of the satisfied RAN rule, and the identification of the AP 130 or 140) (step S405), and then transmits an RRC CONNECTION RECONFIGURATION message with the indication of the DRBs to be offloaded (step S406).

Specifically, with the identification of the satisfied RAN rule, the access network 121 may determine a larger amount of data traffic to be offloaded if the reported signal quality is far less than the validity condition in the satisfied RAN rule, or the other way around. With the identification of the AP 130 or 140, the access network 121 may determine a larger amount of data traffic to be offloaded if the AP 130 or 140 is deployed by the operator of the telecommunication network 120, or a smaller amount of data traffic to be offloaded if the AP 130 or 140 is not deployed by the operator of the telecommunication network 120.

In response to receiving the RRC CONNECTION RECONFIGURATION message, the mobile communication device 110 replies with an RRC CONNECTION RECONFIGURATION COMPLETE message to acknowledge the reception of the RRC CONNECTION RECONFIGURATION message (step S407), and initiates a NAS signaling procedure with the core network 122 to request deactivation of the bearer contexts corresponding to the DRBs (step S408). Detailed description of the NAS signaling procedure is omitted herein since it is beyond the scope of the invention, and reference may be made to the 3rd Generation Partnership Project (3GPP) specifications.

After finishing the NAS signaling procedure, the core network 122 sends a release request to instruct the access network 121 to release the DRBs (step S409). When receiving the release request, the access network 121 transmits an RRC CONNECTION RECONFIGURATION message with the indication of the DRBs to be offloaded to the mobile communication device 110 (step S410), due to the fact that the indicated DRBs do not encompass all of the DRBs existing between the access network 121 and the mobile communication device 110 in this embodiment. When receiving the RRC CONNECTION RECONFIGURATION message, the mobile communication device 110 releases the DRBs (step S411), and replies with an RRC CONNECTION RECONFIGURATION COMPLETE message to acknowledge the reception of the RRC CONNECTION RECONFIGURATION message (step S412). After that, the mobile communication device initiates a connection establishment procedure with the AP 130 or 140 for offloading the data traffic associated with the released DRBs (step S413).

Alternatively, in another embodiment, when receiving the RRC CONNECTION RECONFIGURATION message in step S410, the mobile communication device 110 may not release the DRBs, if the RRC CONNECTION RECONFIGURATION message indicates so. That is, step S411 may be skipped, and the DRBs are kept while the data traffic will still be offloaded to the AP 130 or 140.

Figure 5:
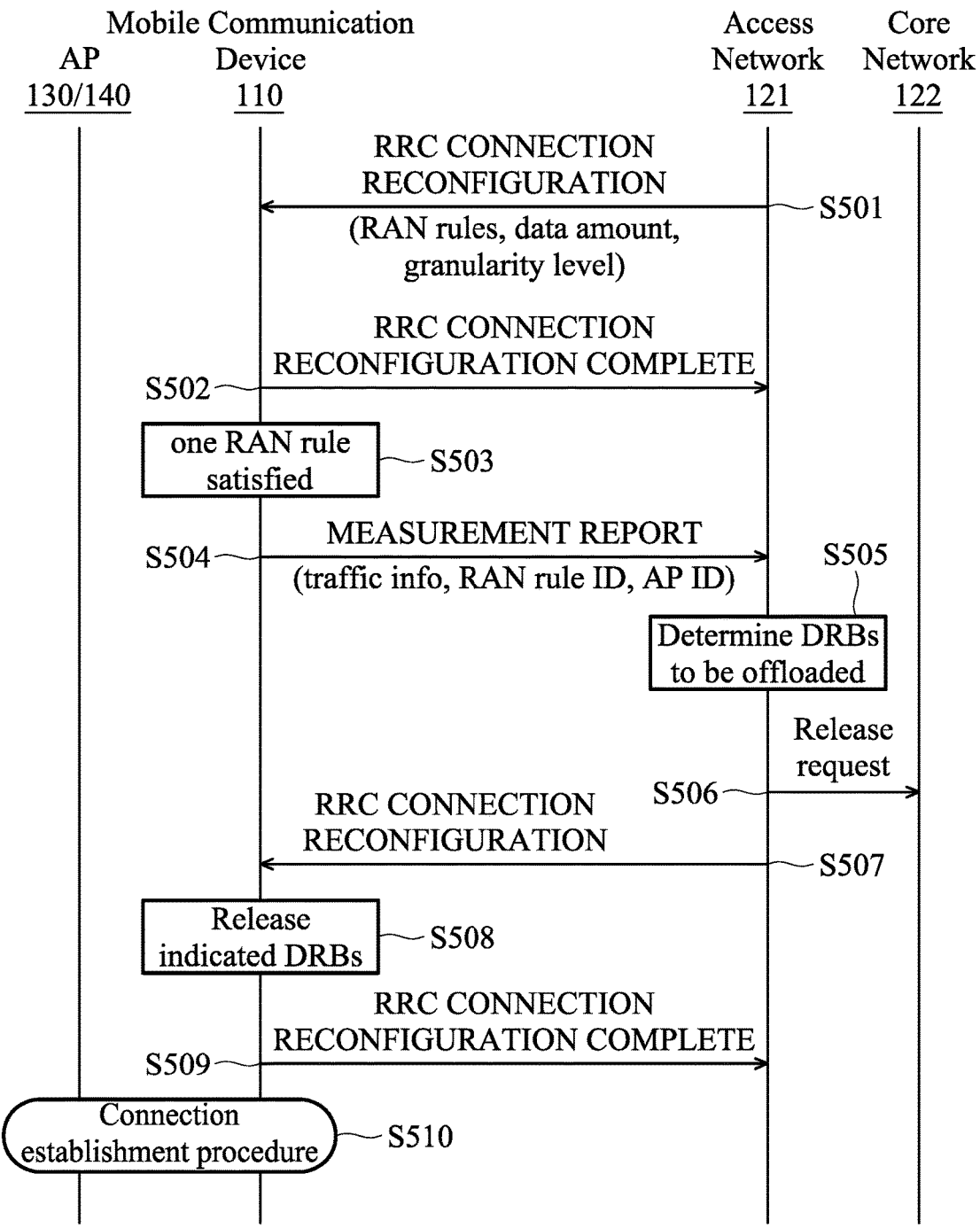
FIG. 5 is a message sequence chart illustrating the network-based steering of data traffic from the telecommunication network 120 to the AP 130 or 140 according to another embodiment of the invention.

FIG. 5 is a message sequence chart illustrating the network-based steering of data traffic from the telecommunication network 120 to the AP 130 or 140 according to another embodiment of the invention. Steps S501 to S505 are the same as steps S401~S405 of FIG. 4, and detailed description is not repeated herein for brevity. However, in contrast to the embodiment of FIG. 4, the access network 121 directly communicates with the core network 122 for deactivating the bearer contexts corresponding to the DRBs, and thus, the NAS signaling procedure between the mobile communication device 110 and the core network 122 is not required in the embodiment of FIG. 5.

Subsequent to step S505, the access network 121 sends a release request to the core network 122 for deactivating the bearer contexts corresponding to the DRBs (step S506). In one embodiment, if the telecommunication network 120 is an LTE system, the release request may be a Bearer Release Request message, an Initial Context Setup Complete message, a Handover Request Ack and UE Context Response message, or a Path Switch Request message, which indicates the release of a bearer. Next, the access network 121 transmits an RRC CONNECTION RECONFIGURATION message with the indication of the DRBs to be offloaded to the mobile communication device 110 (step S507), due to the fact that the indicated DRBs do not encompass all of the DRBs existing between the access network 121 and the mobile communication device 110 in this embodiment. When receiving the RRC CONNECTION RECONFIGURATION message, the mobile communication device 110 releases the DRBs (step S508), and replies with an RRC CONNECTION RECONFIGURATION COMPLETE message to acknowledge the reception of the RRC CONNECTION RECONFIGURATION message (step S509). After that, the mobile communication device initiates a connection establishment procedure with the AP 130 or 140 for offloading the data traffic associated with the released DRBs (step S510).

Figure 6:
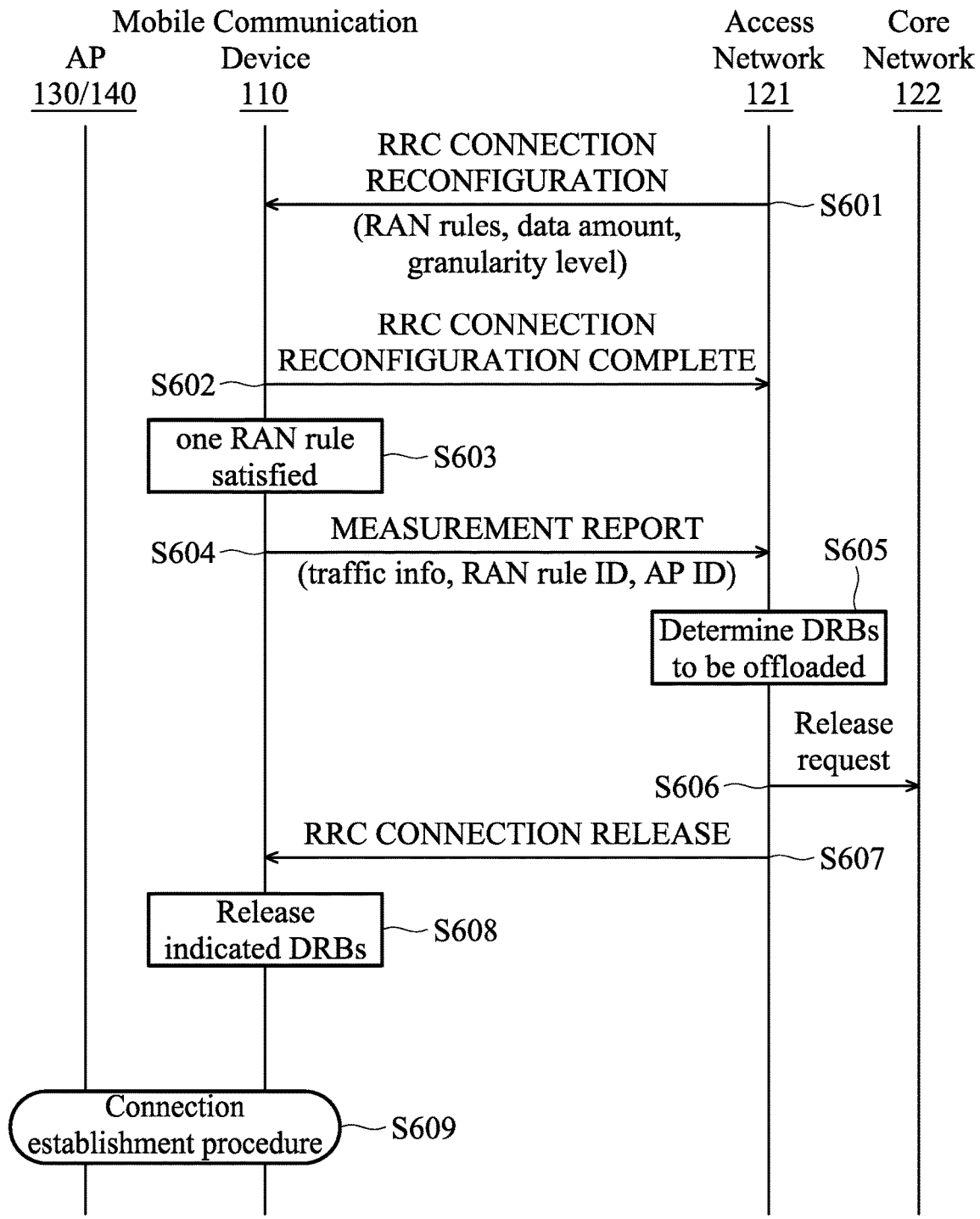
FIG. 6 is a message sequence chart illustrating the network-based steering of data traffic from the telecommunication network 120 to the AP 130 or 140 according to yet another embodiment of the invention.

FIG. 6 is a message sequence chart illustrating the network-based steering of data traffic from the telecommunication network 120 to the AP 130 or 140 according to yet another embodiment of the invention. Similar to the embodiment of FIG. 5, the embodiment of FIG. 6 does not involve the NAS signaling procedure between the mobile communication device 110 and the core network 122, and steps S601 to S605 are the same as steps S401~S405 of FIG. 4.

Subsequent to step S605, the access network 121 sends a release request to the core network 122 for deactivating the bearer contexts corresponding to the DRBs (step S606). Next, the access network 121 transmits an RRC CONNECTION RELEASE message with the indication of the DRBs to be offloaded to the mobile communication device 110 (step S607), due to the fact that the indicated DRBs encompass all of the DRBs existing between the access network 121 and the mobile communication device 110 in this embodiment. When receiving the RRC CONNECTION RELEASE message, the mobile communication device 110 releases the DRBs (step S608), and initiates a connection establishment procedure with the AP 130 or 140 for offloading the data traffic associated with the released DRBs (step S609).

In one embodiment, the RRC CONNECTION RELEASE message may include a specific release cause indicating the purpose of traffic offloading, so that the mobile communication device 110 may identify the specific release cause and then perform the connection release procedure with the access network 121 and the connection establishment procedure with the AP 130 or 140.

Figure 7:
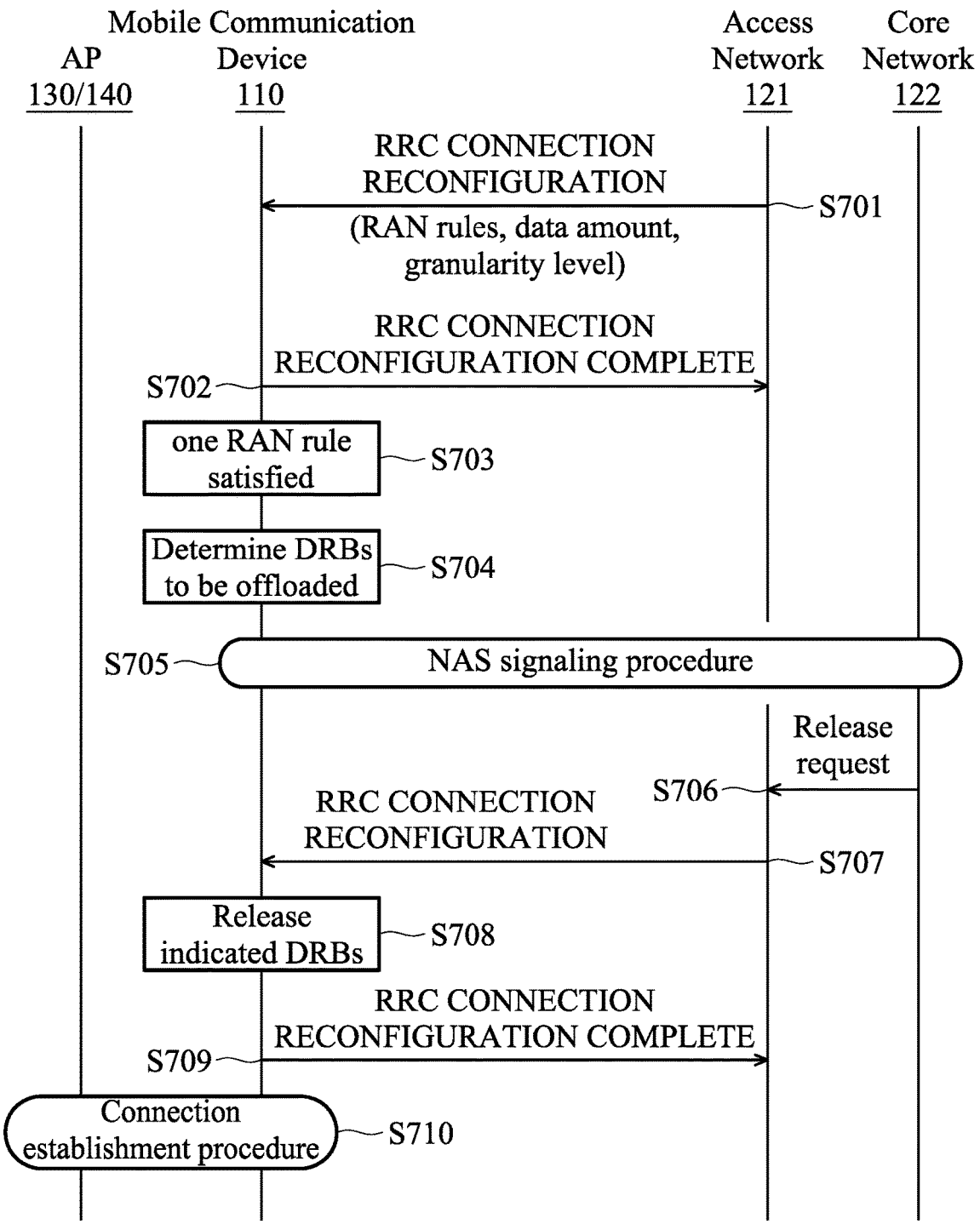
FIG. 7 is a message sequence chart illustrating the UE-based steering of data traffic from the telecommunication network 120 to the AP 130 or 140 according to an embodiment of the invention.

FIG. 7 is a message sequence chart illustrating the UE-based steering of data traffic from the telecommunication network 120 to the AP 130 or 140 according to an embodiment of the invention. Steps S701 to S703 are the same as steps S401~S403 of FIG. 4, and detailed description is not repeated herein for brevity. However, in contrast to the embodiment of FIG. 4, it is the mobile communication device 110 that determines the data traffic to be offloaded and communicates with the core network 122 for deactivating the bearer contexts associated with the data traffic.

Specifically, the mobile communication device 110 determines the DRBs associated with the data traffic to be offloaded according to the traffic information (step S704), and initiates a NAS signaling procedure with the core network 122 to request deactivation of the bearer contexts corresponding to the DRBs (step S705). After finishing the NAS signaling procedure, the core network 122 sends a release request to instruct the access network 121 to release the DRBs (step S706).

When receiving the release request, the access network 121 transmits an RRC CONNECTION RECONFIGURATION message with the indication of the DRBs to be offloaded to the mobile communication device 110 (step S707), due to the fact that the indicated DRBs do not encompass all of the DRBs existing between the access network 121 and the mobile communication device 110 in this embodiment. When receiving the RRC CONNECTION RECONFIGURATION message, the mobile communication device 110 releases the DRBs (step S708), and replies with an RRC CONNECTION RECONFIGURATION COMPLETE message to acknowledge the reception of the RRC CONNECTION RECONFIGURATION message (step S709). After that, the mobile communication device initiates a connection establishment procedure with the AP 130 or 140 for offloading the data traffic associated with the released DRBs (step S710).

In another embodiment for the UE-based steering of data traffic, there may be two types of RAN rules, wherein the first type of RAN rules are used for steering the data traffic associated with new Internet Protocol (IP) flows to the AP 130 or 140, and the second type of RAN rules are used for steering the data traffic associated with new IP flows and all existing IP flows to the AP 130 or 140. That is, when one of the first type of RAN rules is satisfied, the IP flows which have not been transmitted in the telecommunication network 120 should be offloaded to the AP 130 or 140, and the IP flows that have been transmitted in the telecommunication network 120 or in the AP 130 or 140 should remain in the telecommunication network 120 or in the AP 130 or 140. Thus, the first type of RAN rules may achieve the effect of congestion prevention.

Furthermore, when one of the second type of RAN rules is satisfied, the IP flows which have or have not been transmitted in the telecommunication network 120 should all be offloaded to the AP 130 or 140. Thus, the second type of RAN rules may achieve the effect of congestion resolution.

Alternatively, an offload indicator, instead of the types of RAN rules, may be employed for the UE-based steering of data traffic to achieve the effects of congestion prevention and congestion resolution. Specifically, the offload indicator is transmitted by the access network 121 to the mobile communication device 110 via a broadcast message or a dedicated message, which indicates whether the data traffic should be offloaded to the telecommunication network 120 or the AP 130 or 140. For example, if the offload indicator is set to 1, the new IP flows may be offloaded from the telecommunication network 120 to the AP 130 or 140 and the existing IP flows may remain at where they are when one of the RAN rules is satisfied. Otherwise, if the offload indicator is set to 0, the new IP flows may be offloaded form the AP 130 or 140 to the telecommunication network 120 and the existing IP flows may remain at where they are when one of the RAN rules is satisfied.

While the invention has been described by way of example and in terms of preferred embodiment, it is to be understood that the invention is not limited thereto. Those who are skilled in this technology can still make various alterations and modifications without departing from the scope and spirit of this invention.

Use of ordinal terms such as "first" and "second" in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, comprising:
   a first RF circuit, performing wireless transmissions and receptions to and from a telecommunication network using a cellular technology;
   a second RF circuit, performing wireless transmissions and receptions to and from an Access Point (AP) using a Short Range Wireless (SRW) technology; and
   a baseband processor receiving, from the telecommunication network via the first RF circuit, one or more Radio Access Network (RAN) rules and information concerning an amount of data traffic to be offloaded and a level of granularity of data traffic to be reported to the telecommunication network, reporting traffic information to the telecommunication network via the first RF circuit when one of the RAN rules is satisfied, receiving a first traffic offloading request from the telecommunication network via the first RF circuit in response to reporting the traffic information to the telecommunication network, determining a type of the satisfied RAN rule, releasing one or more first Data Radio Bearers (DRBs) associated with data traffic indicated by the first traffic offloading request, and offloading the data traffic from the telecommunication network to the AP via the second RF circuit,
   wherein, when the type is determined to be a first predetermined type, the baseband processor further establishes one or more second DRBs with the AP for a new Internet Protocol (IP) flow which has not been transmitted in the telecommunication network, and when the type is determined to be a second predetermined type, the first DRBs are associated with one or more existing IP flows which have been transmitted in the telecommunication network; and
   wherein the level of granularity specifies a per DRB basis, a per Packet Data Network (PDN) connection basis, or a per PDN basis.

2. The mobile communication device of claim 1, wherein the baseband processor further transmits a first traffic offloading response to the telecommunication network via the first RF circuit to acknowledge the reception of the first traffic offloading request.

3. The mobile communication device of claim 2, wherein the first traffic offloading request is an RRC CONNECTION RECONFIGURATION message or an RRC CONNECTION RELEASE message, and the first traffic offloading response is an RRC CONNECTION RECONFIGURATION COMPLETE message.

4. The mobile communication device of claim 1, wherein, after reporting the traffic information and prior to receiving the first traffic offloading request, the baseband processor further receives a second traffic offloading request from the telecommunication network via the first RF circuit, transmits a second traffic loading response to the telecommunication network via the first RF circuit to acknowledge the reception of the second traffic offloading request, and initiates, via the first RF circuit, a Non-Access Stratum (NAS) signaling procedure with the telecommunication network to request deactivation of bearer contexts associated with the data traffic.

5. The mobile communication device of claim 4, wherein the second traffic offloading request and the second traffic offloading response are an RRC CONNECTION RECONFIGURATION message and an RRC CONNECTION RECONFIGURATION COMPLETE message, respectively.

6. The mobile communication device of claim 1, wherein, when the one of the RAN rules is satisfied and prior to receiving the first traffic offloading request, the baseband processor further determines the first DRBs and initiates, via the first RF circuit, a Non-Access Stratum (NAS) signaling procedure with the telecommunication network to request deactivation of bearer contexts corresponding to the first DRBs.

7. The mobile communication device of claim 1, wherein the baseband processor further receives an offload indicator from the telecommunication network via the first RF circuit, and the establishing of the second DRBs is performed further when the offload indicator is set to a predetermined value.

8. The mobile communication device of claim 1, wherein each of the RAN rules comprises a first validity condition and a second validity condition, wherein the first validity condition specifies a first signal quality of the telecommunication network being lower than a first threshold, and the second validity condition specifies a second signal quality of the AP being greater than a second threshold.

9. The mobile communication device of claim 1, wherein the traffic information comprises at least one of the following:
   quality of Service (QoS) parameters of the first DRBs;
   indicators, each of which indicates whether a respective one of the first DRBs is a default Evolved Packet System (EPS) bearer or a dedicated EPS bearer;
   information concerning Access Point Names (APNs) or Packet Data Network (PDN) connections, to each of which a respective one of the first DRBs belongs; and
   information concerning whether the mobile communication device supports Internet Protocol (IP) Flow Mobility (IFOM) or Multi-Access PDN Connectivity (MAPCON).

10. The mobile communication device of claim 1, wherein the baseband processor further reports at least one of the following, along with the traffic information, to the telecommunication network via the first RF circuit:
    an identification of the satisfied RAN rule; and
    an identification of the AP.

11. The mobile communication device of claim 1, wherein the RAN rules is received via an RRC CONNECTION RECONFIGURATION message, and the baseband processor further transmits an RRC CONNECTION RECONFIGURATION COMPLETE message to the telecommunication network via the first RF circuit to acknowledge the reception of the RRC CONNECTION RECONFIGURATION message.

12. The mobile communication device of claim 1, wherein the traffic information is reported to the telecommunication network via a MEASUREMENT REPORT message.

13. An access network of a telecommunication network, comprising:
    an access node comprising:
    a RF circuit performing wireless transmissions and receptions to and from a mobile communication device using a cellular technology; and
    a baseband processor transmitting, to the mobile communication device via the RF circuit, one or more one Radio Access Network (RAN) rules and information concerning an amount of the data traffic to be offloaded and a level of granularity of data traffic to be reported to the telecommunication network, transmitting an offload indicator to the mobile communication device via the RF circuit, receiving traffic information from the mobile communication device via the RF circuit when the mobile communication device determines that one of the RAN rules is satisfied, and in response to receiving the traffic information from the mobile communication device, transmitting a first traffic offloading request to the mobile communication device via the RF circuit, to request the mobile communication device to offload data traffic to an Access Point (AP) using a Short Range Wireless (SRW) technology and release one or more first Data Radio Bearers (DRBs) associated with the data traffic, wherein when the offload indicator is set to a predetermined value, the baseband processor further establishes one or more second DRBs with the AP for a new Internet Protocol (IP) flow which has not been transmitted in the telecommunication network, wherein the level of granularity specifies a per DRB basis, a per Packet Data Network (PDN) connection basis, or a per PDN basis.

14. The access network of claim 13, wherein the baseband processor further receives a first traffic offloading response from the mobile communication device via the RF circuit for acknowledging the reception of the first traffic offloading request by the mobile communication device.

15. The access network of claim 14, wherein the first traffic offloading request is an RRC CONNECTION RECONFIGURATION message or an RRC CONNECTION RELEASE message, and the first traffic offloading response is an RRC CONNECTION RECONFIGURATION COMPLETE message.

16. The access network of claim 13, wherein, after receiving the traffic information and prior to transmitting the first traffic offloading request, the baseband processor further transmits a second traffic offloading request to the mobile communication device via the RF circuit, for initiating a Non-Access Stratum (NAS) signaling procedure between the mobile communication device and a core network of the telecommunication network to request deactivation of bearer contexts associated with the data traffic, and receives a second traffic loading response from the mobile communication device via the RF circuit for acknowledging the reception of the second traffic offloading request by the mobile communication device.

17. The access network of claim 16, wherein the second traffic offloading request and the second traffic offloading response are an RRC CONNECTION RECONFIGURATION message and an RRC CONNECTION RECONFIGURATION COMPLETE message, respectively.

18. The access network of claim 13, wherein, prior to transmitting the first traffic offloading request, the baseband processor further determines the first DRBs according to the traffic information, and indicates the first DRBs in the first offloading request.

19. The access network of claim 13, wherein each of the RAN rules comprises a first validity condition and a second validity condition, wherein the first validity condition specifies a first signal quality of the access network being lower than a first threshold, and the second validity condition specifies a second signal quality of the AP being greater than a second threshold.

20. The access network of claim 13, wherein the traffic information comprises at least one of the following:

quality of Service (QoS) parameters of the first DRBs;

indicators, each of which indicates whether a respective one of the first DRBs is a default Evolved Packet System (EPS) bearer or a dedicated EPS bearer;

information concerning Access Point Names (APNs) or Packet Data Network (PDN) connections, to each of which a respective one of the first DRBs belongs; and information concerning whether the mobile communication device supports Internet Protocol (IP) Flow Mobility (IFOM) or Multi-Access PDN Connectivity (MAPCON).

21. The access network of claim 13, wherein the baseband processor further receives at least one of the following, along with the traffic information, from the mobile communication device via the RF circuit:

an identification of the satisfied RAN rule; and an identification of the AP.

22. The access network of claim 13, wherein the RAN rules is received via an RRC CONNECTION RECONFIGURATION message, and the baseband processor further receives an RRC CONNECTION RECONFIGURATION COMPLETE message from the mobile communication device via the RF circuit for acknowledging the reception of the RRC CONNECTION RECONFIGURATION message by the mobile communication device.

23. The access network of claim 13, wherein the traffic information is received from the mobile communication device via a MEASUREMENT REPORT message.

24. A method for steering data traffic associated with a mobile communication device between a telecommunication network utilizing a cellular technology and an Access Point (AP) utilizing a Short Range Wireless (SRW) technology, comprising:

transmitting to the mobile communication device, by the telecommunication network, one or more Radio Access Network (RAN) rules and information concerning an amount of data traffic to be offloaded and a level of granularity of data traffic to be reported to the telecommunication network, wherein the level of granularity specifies a per Data Radio Bearer (DRB) basis, a per Packet Data Network (PDN) connection basis, or a per PDN basis;

reporting, by the mobile communication device, traffic information to the telecommunication network when one of the RAN rules is satisfied;

transmitting, by the telecommunication network, a first traffic offloading request to the mobile communication device in response to receiving the traffic information from the mobile communication device;

determining, by the mobile communication device, a type of the satisfied RAN rule;

releasing, by the mobile communication device, one or more first DRBs associated with data traffic indicated by the first traffic offloading request, wherein when the type is determined to be a first predetermined type, the mobile communication device further establishes one or more second DRBs with the AP for a new Internet Protocol (IP) flow which has not been transmitted in the telecommunication network, and when the type is determined to be a second predetermined type, the first DRBs are associated with one or more existing IP flows which have been transmitted in the telecommunication network; and offloading, by the mobile communication device, the data traffic to the AP.

25. The method of claim 24, further comprising:
transmitting, by the mobile communication device, a first traffic offloading response to the telecommunication network to acknowledge the reception of the first traffic offloading request.

26. The method of claim 25, wherein the first traffic offloading request is an RRC CONNECTION RECONFIGURATION message or an RRC CONNECTION RELEASE message, and the first traffic offloading response is an RRC CONNECTION RECONFIGURATION COMPLETE message.

27. The method of claim 24, further comprising, after reporting the traffic information and prior to transmitting the first traffic offloading request:
transmitting, by the telecommunication network, a second traffic offloading request to the mobile communication device;
transmitting, by the mobile communication device, a second traffic loading response to the telecommunication network to acknowledge the reception of the second traffic offloading request; and
transmitting, by the mobile communication device, a second traffic loading response to the telecommunication network to acknowledge the reception of the second traffic offloading request; and initiating, by the mobile communication device, a Non-Access Stratum (NAS) signaling procedure with the telecommunication network to request deactivation of bearer contexts associated with the data traffic.

28. The method of claim 27, wherein the second traffic offloading request and the second traffic offloading response are an RRC CONNECTION RECONFIGURATION message and an RRC CONNECTION RECONFIGURATION COMPLETE message, respectively.

29. The method of claim 24, further comprising, prior to transmitting the first offloading request by the telecommunication network:
determining, by the telecommunication network, the first DRBs according to the traffic information; and
indicating, by the telecommunication network, the first DRBs in the first offloading request.

30. The method of claim 24, further comprising, prior to transmitting the first offloading request by the telecommunication network:
determining, by the mobile communication device, the first DRBs when the one of the RAN rules is satisfied; and
initiating, by the mobile communication device, a Non-Access Stratum (NAS) signaling procedure with the telecommunication network to request deactivation of bearer contexts corresponding to the first DRBs.

31. The method of claim 24, further comprising:
transmitting, by the telecommunication network, an offload indicator to the mobile communication device, the establishing of the second DRBs is performed further when the offload indicator is set to a predetermined value.

32. The method of claim 24, wherein each of the RAN rules comprises a first validity condition and a second validity condition, wherein the first validity condition specifies a first signal quality of the telecommunication network being lower than a first threshold, and the second validity condition specifies a second signal quality of the AP being greater than a second threshold.

33. The method of claim 24, wherein the traffic information comprises at least one of the following:
quality of Service (QoS) parameters of the first DRBs;
indicators, each of which indicates whether a respective one of the first DRBs is a default Evolved Packet System (EPS) bearer or a dedicated EPS bearer;
information concerning Access Point Names (APNs) or Packet Data Network (PDN) connections, to each of which a respective one of the first DRBs belongs; and
information concerning whether the mobile communication device supports Internet Protocol (IP) Flow Mobility (IFOM) or Multi-Access PDN Connectivity (MAPCON).

34. The method of claim 24, further comprising:
reporting, by the mobile communication device, at least one of the following, along with the traffic information, to the telecommunication network:
an identification of the satisfied RAN rule; and
an identification of the AP.

35. The method of claim 24, wherein the RAN rules is transmitted via an RRC CONNECTION RECONFIGURATION message, and the method further comprises:
transmitting, by the mobile communication device, an RRC CONNECTION RECONFIGURATION COMPLETE message to the telecommunication network, to acknowledge the reception of the RRC CONNECTION RECONFIGURATION message.

36. The method of claim 24, wherein the traffic information is reported to the telecommunication network via a MEASUREMENT REPORT message.

* * * * *